Patented Sept. 26, 1933

1,928,240

UNITED STATES PATENT OFFICE 1,928,240

PROCESS FOR PRODUCING SIMULTANE-OUSLY ETHYLENE GLYCOL AND ACETAL-DEHYDE

Paul Askenasy and Alfred Heller, Karlsruhe, Germany

No Drawing. Application June 26, 1930
Serial No. 464,058

2 Claims. (Cl. 260—138)

For a long time two raw materials have been known for manufacturing ethylene glycol, viz. ethylene chlorhydrine and ethylene chloride. The saponification of both of them produces glycol, the former in general yielding better results. However, the manufacture of ethylene chlorhydrine is rather a complicated process.

For this reason inventors often have attempted to saponify the ethylene chloride (which is much more easily to be produced) in a manner as to yield profitable amounts of glycol. One of the former inventors recommended the saponification with calcium carbonate or magnesium oxide, water being present, under pressure and at temperatures of 100–150° C. The same inventor asserted that the carbonate of strontium and barium cannot be used for this purpose with the same good effect as carbonate of calcium, saying that the barium and strontium chlorides and bromides do not have the desired physical relations to water of the corresponding calcium salts.

We have examined very carefully the conditions of the saponification of ethylene chloride and their products and in so doing we made our valuable new invention for the simultaneous production of ethylene glycol and acetaldehyde of which the following is a description. We have found that:—

(1) The saponification of ethylene chloride with calcium carbonate in water under pressure at temperatures up to 150° C. glycol at best gives with a yield of 60% of the theory and this, moreover, at a reaction period of 4 to 5 hours.

(2) The assertion of former inventors, that barium- and strontium carbonates are not suitable for the saponification of ethylene chloride with the same good effect as carbonate of calcium, is erroneous; they are on the contrary extremely suitable for this purpose, calcium carbonate however being inappropriate.

We have also found, and this forms an important feature of our invention, that at temperatures above 150° C., especially between 160 and 180° C., the saponification of the ethylene chloride with the carbonates of alkali earth metals proceeds sufficiently quickly, and that under these circumstances acetaldehyde in available quantities is formed beside ethylene glycol under the presumption that the mixture is heated only so long as the development of sensible quantities of carbon dioxide is indicated by the rise of pressure. By longer heating the firstly formed aldehyde is destroyed.

Our invention consists, therefore, in saponifying ethylene chloride at temperatures above 150° C. with the carbonates of alkali earth metals in the presence of water under pressure and by stirring the liquid mixture well whereby glycol and acetaldehyde are produced, it being understood that heating is not to be continued any longer than is necessary to just complete the reaction.

The production of acetaldehyde intermediately in the saponification of ethylene chloride has heretofore not been observed by others nor has it intentionally been produced in this manner, because prior inventors have always heated the reaction mixture for too long a time. Upon such prolonged heating, the acetaldehyde becomes polymerized very quickly and turns into slushy substances, which are not only to be considered as worthless waste, but are undesirable because they decrease the yield and impair the quality of the glycol obtained.

In carrying out our new method of saponifying ethylene chloride at temperatures above 150° C. effecting the simultaneous production of glycol and aldehyde, we already use sufficient water in the autoclave so as to get a liquid containing about 10% of glycol, for we have observed that a more restricted quantity of water, as prescribed by other inventors, gives unsatisfactory yields of glycol. Moreover, we preferably introduce the ethylene chloride into the autoclave, containing the well-stirred suspension of the alkali earth carbonate with water, not before the temperature in the autoclave has risen to 160° C. This, however, is not indispensible and we can also first mix the water, the alkali earth carbonate and the ethylene chloride in the cold autoclave and then heat it up to 160–180° C. while stirring its contents vigorously.

By injecting the ethylene chloride, as we do, into the preheated autoclave, the time required to complete the reaction amounts to about half or three quarters of an hour instead of three and more hours as are needed in working at temperatures below 150° C. This is of importance because secondary reactions do not appear to such a great extent in spite of the higher temperature, on account of the shorter reaction time.

Other inventors have also worked with temperatures over 160° C. but, as previously mentioned, this heat was applied over a much longer time so that they not only failed to observe the acetaldehyde but that which formed disappeared due to polymerization.

We have found that it is indispensible to remove the aldehyde formed even during the reaction period from the mixtures of liquids and vapors in the autoclave. For this purpose we discharge continuously a part of the vapors from the upper part of the autoclave and condense it by cooling with or without pressure. From the liquid so obtained the aldehyde is distilled off whereupon we reintroduce the aldehyde-free liquid into the autoclave. Preferably however the vapors escaping from the autoclave are cooled only to such an extent as to condense all the other compounds contained in the vapor mixture except the aldehyde and reinject the condensed liquid mixture into the autoclave. The aldehyde-containing part of the vapors is then cooled separately and thus obtained in a substantially pure condition. In this way we prevent the aldehyde from being resinified to too large an extent. This resinification may also be reduced by adding at the very beginning a quantity of alkali earth metal chloride to the water in the autoclave.

At the same time as we draw off the vapors, as mentioned, we may remove the carbonic acid escaping with it entirely or partially, or we may introduce it into the autoclave.

The process may be developed to a cyclic one in respect of the carbonate used, which constitutes of course a considerable economic advantage especially when barium carbonate, i. e., a rather expensive product, is used. This cyclic process consists in the following steps, barium carbonate being used as example: barium chloride resulting from the saponification of the ethylene chloride with barium carbonate is decomposed with a solution of ammonium carbonate, producing thus barium carbonate and ammonium chloride. The former is filtered off and used again for the saponification of a new part of ethylene chloride, the latter is decomposed by calcium hydroxide whereupon the so regained ammonia is recombined with the carbon dioxide from the process of saponification, and the ammonium carbonate thus formed is reintroduced in the cyclic process of regenerating barium carbonate.

By applying, for instance, a surplus of 5% of barium carbonate over the theoretical amount, and such an amount of water as to cause a solution of about 8% of glycol by the reaction in the autoclave, further employing a temperature of 170° C. and a reaction period of 45 minutes, we obtain a yield in ethylene glycol of about 75% and in aldehyde of about 12% of the theoretical amount.

Speaking here of theory we wish to be understood in the following sense:—In the autoclave the ethylene chloride is firstly saponified into ethylene chlorhydrine and from this the greater part is further saponified into glycol. From a minor part of the chlorhydrine, hydrogen chloride is split off, vinyl alcohol being thus formed, which, by intramolecular transposition, is transformed into aldehyde.

In so far as slight losses of ammonia and carbonic acid or barium salts occur in the cyclic process, offering an accessory means to our invention, we replace these losses by introducing small fresh quantities of these substances from outside.

Thus the barium salts, the carbonic acid and the ammonia revolve in a cycle during the production of glycol and aldehyde, the ethylene chloride being successfully saponified and the chlorine being removed in the cheapest way in the form of calcium chloride. The saponification consumes only lime and heat.

What we claim is:—

1. A process for simultaneously producing ethylene glycol and acetaldehyde comprising reacting ethylene chloride with water and barium carbonate in an autoclave under pressure at temperatures between 160 and 180° C. for a period of time not exceeding one hour, continuously removing a part of the vapors from the upper part of the autoclave and condensing the higher boiling compounds and the acetaldehyde therefrom and reintroducing said higher boiling compounds into the autoclave.

2. A process for simultaneously producing ethylene glycol and acetaldehyde comprising reacting ethylene chloride with water and barium carbonate in an autoclave under pressure at temperatures between 160 and 180° C. for a period of time from about ½ hour to about ¾ hour, continuously removing a part of the autoclave and condensing the higher boiling compounds and the acetaldehyde therefrom and reintroducing said higher boiling compounds into the autoclave.

PAUL ASKENASY.
ALFRED HELLER.